United States Patent Office 3,457,284
Patented July 22, 1969

---

3,457,284
5β,6β-METHYLENE STEROIDS
Lawrence H. Knox, deceased, late of Mexico City, Mexico, by Anne A. Knox, legal representative, Mexico City, Mexico, assignor to Syntex Corporation, Panama, Panama, a corporation of Panama
No Drawing. Continuation of application Ser. No. 538,431, Mar. 29, 1966. This application Aug. 1, 1968, Ser. No. 751,690
Claims priority, application Mexico, Mar. 31, 1965, 81,826, 81,827
Int. Cl. C07c *169/34, 169/10, 167/00*
U.S. Cl. 260—397.3                                26 Claims

ABSTRACT OF THE DISCLOSURE

Novel 5β,6β-methylene steroids of the 19-norpregnene and 19-norandrostene series prepared by the reaction of 19-hydroxy-Δ⁵ steroids with an α-fluorinated amine which are useful therapeutic agents.

---

This is a continuation-in-part of U.S. application Ser. No. 538,431, filed Mar. 29, 1966, now abandoned.

The present invention relates to novel cyclopentanophenanthrene derivatives and to processes for their preparation. More particularly, this invention relates to 5β,6β-methylene-19-norpregn-9-ene and 5β,6β-methylene-19-norpregn-1(10)-ene derivatives.

The compounds of the present invention may be represented by the formula:

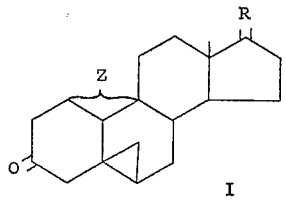

wherein R is an oxygen atom or the group

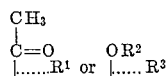

in which $R^1$ is hydrogen, hydroxy or acyloxy, $R^2$ is hydrogen, tetrahydropyranyl or acyl, and $R^3$ is hydrogen, lower alkyl, lower alkenyl or lower alkynyl; and Z is a double bond between C–1 and C–10 or between C–9 and C–10.

The hydrocarbon carboxylic acyl and acyloxy groups of the compounds of the present invention will contain less than 12 carbon atoms and may be of a straight, branched, cyclic or cyclic-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropriopionate, adamantoate, and the like.

Those compounds having the 2-carbon pregnane side chain in the 17β-position and those having a 17α-alkynyl substituent demonstrate progestational activity and are useful in the control of fertility and in the treatment of various menstrual disorders. Those compounds of the present invention having a divalent oxygen atom in the 17-position and those having a 17β-hydroxy group with or without alkyl or alkenyl substitution in the 17α-position are anabolic agents useful in the treatment of debilitary conditions such as old age, postoperative recuperation, and the like. The compounds of the present invention also exhibit anti-androgen properties and are thus valuable in the treatment of acne, benign prostate hypertrophy and hirsutism in females.

The compounds of the present invention may be prepared via utilization of the following reaction:

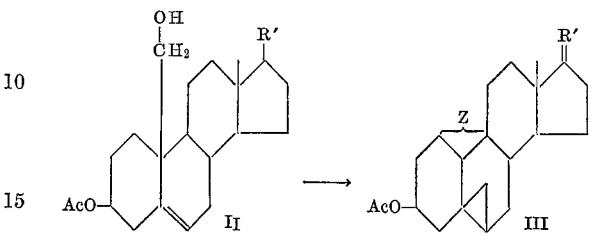

In the foregoing, Ac is acyl and R' is an oxygen atom or the group

in which $R^{1'}$ is hydrogen or acyloxy.

In accordance with the present invention, a 3β-acyloxy-19-hydroxy-Δ⁵-steroid (Formula II) is treated with an α-fluorinated amine of the formula

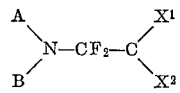

in which $X^1$ is fluoro or chloro; $X^2$ is fluoro, chloro or trifluoromethyl; each of A and B are alkyl of 1 to 6 carbon atoms or, taken together, alkylene of from 5 to 7 carbon atoms inclusively. Typical of such reactants are 1-diethylamino - 1,1,2 - trifluoro-2-chloroethane, 1-dimethylamino-1,1,2,2-tetrafluoroethane, 1-dipropylamino-1,1,2-trifluoro-2 - chloroethane, 1-diethylamino-1,1-difluoro-2,2-dichloroethane, and the like. The reaction is generally conducted at elevated temperatures in an inert, nonpolar, organic solvent such as methylene chloride, dihydrofuran or acetonitrile. One convenient method utilizes the reflux temperature of the solvent, e.g. acetonitrile, to control the reaction temperature.

Upon such treatment with a slight excess, e.g. 1.5 molar equivalents, of the above α-fluorinated amine for a period of time of from about one to about two hours, there is obtained a mixture of the 3β-acyloxy-5β,6β-methylene-Δ⁹- and 3β-acyloxy-5β,6β-methylene-Δ¹⁽¹⁰⁾-steroids of Formula III. These two components may be separated via conventional techniques such as fractional crystallization, chromatography, or the like, or the mixture may be further processed with separation being effected at a later stage of the reaction sequence if desired.

In the case of the 5β,6β-methylene-19-norpregn-9-enes and -19-norpregn-1(10)-enes of Formula III, conventional saponification, as with potassium bicarbonate or potassium hydroxide in methanol, then yields the corresponding 3β-hydroxy derivatives, which may be oxidized as with chromic acid to yield the 5β,6β-methylene-19-norpregn-9-ene-3,20-diones and 5β,6β-methylene-19-norpregn-1(10)-ene-3,20-diones. The 17α-acyloxy group, when present in these derivatives, may be hydrolyzed via conventional techniques, as with refluxing methanolic potassium bicarbonate, and the resulting 17α-hydroxy compound may in turn be reacylated, if desired, with a carboxylic acid anhydride in the presence of an acid catalyst such as p-toluenesulfonic acid.

In the case of the 3β-acyloxy-5β,6β-methyleneestr-9-enes and 3β-acyloxy-5β,6β-methyleneestr-1(10)-enes of Formula III, the 17-keto derivatives may be subjected to the analogous synthetic routes described above to yield the corresponding 5β,6β-methyleneestr-9-ene-3,17-dione and -ester-1(10)-ene-3,17-dione, or alternatively may be treated with a lower alkyl, lower alkenyl or lower alkynyl magnesium halide, or with an alkyl lithium salt, or with an alkenyl sodium or potassium salt to yield the corresponding 5β,6β-methylene - 17β - hydroxyester-9-ene or -estr-1(10)-ene substituted in the 17α-position by a lower alkyl, lower alkenyl or lower alkynyl group. Such 17α-lower alkynyl derivatives may in turn be converted to the corresponding 17α-lower alkenyl or 17α-lower alkyl derivative via conventional controlled catalytic hydrogenation. These derivatives may then be hydrolyzed, if such has not already been done, and oxidized as previously described to yield the corresponding 3-keto-5β,6β-methylene-17β-hydroxyestr-9-ene or -estr-1(10)-ene substituted in the 17α-position by a lower alkyl, lower alkenyl or lower alkynyl group. The tertiary 17β-hydroxy group may be acylated via conventional techniques, as for example with acetic anhydride and p-toluenesulfonic acid in benzene.

In the case of the 5β,6β-methylene-17β-hydroxyestr-9-ene or -estr-1(10)-ene bearing only a hydrogen atom in the 17α-position, the corresponding 3,17-dione is first reduced with a metal hydride such as lithium aluminum hydride, and the resulting 3,17-diol is then back oxidized as with 2,3-dichloro-5,6-dicyanobenzoquinone to yield the desired 3-keto-17β-hydroxy compound. This 17β-hydroxy derivative may be acylated via conventional techniques, as for example with acetic anhydride in pyridine, to yield the corresponding 17β-acylates.

Formation of the 17β-tetrahydropyranyl ethers may be obtained via treatment of the corresponding 17β-hydroxy compound with dihydropyran in the presence of an acid catalyst.

The 5β,6β-methylene-Δ¹⁽¹⁰⁾ derivatives of the present invention may be further modified to the corresponding Δ¹⁽²⁾ derivatives through treatment with acid or base, preferably with a dilute solution of sodium methoxide in methanol. Thus provided are compounds having analogous utilities to those described above and having the formula:

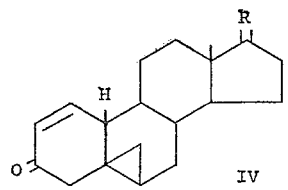

wherein R is as defined above.

The following examples will serve to further typify the nature of this invention, but being presented solely for the purpose of illustration, they should not be construed as a limitation thereof.

Example 1

A solution of 11.2 g. of 3β-acetoxy-20-ketopregn-5-en-19-ol in 125 ml. of anhydrous acetonitrile is refluxed for one hour under anhydrous conditions with 8.5 g. of 1-diethylamino-1,1,2-trifluoro-2-chloroethane. The total reaction product is chromatographed on 600 g. of alumina, eluting the column first with hexane and then with methylene chloride. The crystalline fractions are combined and recrystallized from methanol, thus yielding 5.7 g. of 3β - acetoxy - 5β,6β - methylene - 19 - norpregn - 1(10)-en-20-one, melting point 104–105° C.; [α]$_D$+77°

(CHCl$_3$)

The mother liquors and oily fractions are rechromatographed on 300 g. of alumina, eluting with 4:1 hexane:ether to yield 2 g. of 3β-acetoxy-5β,6β-methylene-19-norpregn-9-ene-20-one, melting point 76–78° C.;

[α]$_D$+72°

(CHCl$_3$); λ max. 217–218 mμ, log ε 3.89.

In a similar fashion, 3β,17α-diacetoxy-5β,6β-methylene-19-norpregn-1(10)-en-20-one and 3β,17α-diacetoxy-5β,6β-methylene-19-norpregn-9-en-20-one are prepared from 3β,17α-diacetoxy-20-ketopregn-5-en-19-ol.

Example 2

One gram of 3β-acetoxy-5β,6β-methylene-19-norpregn-1(10)-en-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 3β-hydroxy-5β,6β-methylene-19-norpregn-1(10)-en-20-one, which is collected by filtration and recrystallized from acetone:hexane.

In a similar fashion, the following compounds are prepared: 3β-hydroxy-5β,6β-methylene-19-norpregn-9-en-20-one; 3β - hydroxy - 5β,6β-methylene-17α-acetoxy-19-norpregn-1(10)-en-20-one and 3β-hydroxy-5β,6β-methylene-17α-acetoxy-19-norpregn-9-en-20-one.

Example 3

To a solution of 9 g. of sodium dichromate in 6 ml. of sulfuric acid and 140 ml. of water cooled to 5° C., there is added a solution of 2 g. of 3β-hydroxy-5β,6β-methylene-19-norpregn-1(10)-en-20-one in 800 ml. of ether, the reaction mixture being stirred at the same temperature for one and one-half hours. The organic layer is separated and washed with sodium bicarbonate solution and water to neutrality, dried over anhydrous sodium sulfate and evaporated to dryness under vacuum. The residue is recrystallized from acetone:hexane, thus yielding 5β,6β-methylene-19-norpregn - 1(10) - ene-3,20-dione, melting point 117–118° C.; [α]$_D$−129° (CHCl$_3$).

Likewise, the following compounds are prepared via the procedure of this example: 5β,6β-methylene-19-norpregn-9-ene-3,20-dione; 5β,6β-methylene-17α-acetoxy-19-norpregn - 1(10) - ene-3,20-dione; and 5β,6β-methylene-17α-acetoxy-19-norpregn-9-ene-3,20-dione.

Example 4

A solution of 0.17 g. of potassium hydroxide in 0.2 ml. of water and 2.5 ml. of methanol is added over a period of 30 minutes to a refluxing solution of 1 g. of 5β,6β-methylene - 17α - acetoxy - 19 - norpregn - 9 - ene - 3,20-dione in 30 ml. of methanol under nitrogen. The solution is refluxed for two hours, cooled, neutralized with acetic acid and concentrated under reduced pressure. After the addition of water, the solid which forms is collected by filtration and dried to yield 5β,6β-methylene-17α-hydroxy-19-norpregn-9-ene-3,20-dione, which is recrystallized from acetone:hexane.

5β,6β - methylene - 17α - hydroxy - 19 - norpregn-1(10)-ene-3,20-dione is prepared in a similar fashion from the corresponding 17α-acetoxy derivative.

Example 5

To a solution of 5 g. of 5β,6β-methylene-17α-hydroxy-19-norpregn-9-ene-3,20-dione in 100 ml. of anhydrous benzene are added 1 g. of p-toluenesulfonic acid and 10 ml. of propionic anhydride. The mixture is allowed to stand for 24 hours at room temperature and is then poured with stirring into ice and water. The organic phase is separated, washed with 10% sodium carbonate solution and with water, dried and evaporated to yield 5β,6β - methylene - 17α - propionoyloxy - 19 - norpregn-9-ene-3,20-dione, which is further purified through recrystallization from ether:hexane.

5β,6β - methylene - 17α - propionoyloxy - 19 - norpregn-1(10)-ene-3,20-dione is obtained in a similar fashion from the corresponding 17α-hydroxy compound.

By utilizing other anhydrides, such as caproic anhydride, in the foregoing procedure, the analogous 17α-acylates are obtained, e.g. 5β,6β-methylene-17α-caproyloxy-19-norpregn-1(10)-ene-3,20-dione and 5β,6β-methylene-17α-caproyloxy-19-norpregn-9-ene-3,20-dione.

Example 6

A mixture of 5.54 g. of 3β-acetoxy-19-hydroxyandrost-5-en-17-one and 4.56 g. of 1-diethylamino-1,1,2-trifluoro-2-chloroethane in 100 ml. of anhydrous acetonitrile is heated at reflux temperatures for one hour. At the end of this time, the mixture is allowed to reach room temperature and is then chromatographed on 300 g. of alumina, eluting with hexane, to yield 3β-acetoxy-5β,6β-methyleneestr-9-en-17-one and 3β-acetoxy-5β,6β-methyleneestr-1(10)-en-17-one.

A mixture of 1 g. of 3β-acetoxy-5β,6β-methyleneestr-9-en-17-one and 20 ml. of a 2% methanolic potassium hydroxide solution is heated at steam bath temperatures until solution is complete. This solution is allowed to stand at room temperature for about 15 hours and is then diluted with water. The solid thus formed is collected by filtration, washed with water to neutrality and dried in vacuo to yield 3β-hydroxy-5β,6β-methyleneestr-9-en-17-one, melting point 158–160° C., which is recrystallized from acetone.

To a solution of 4.0 g. of 3β-hydroxy-5β,6β-methyleneestr-9-en-17-one in 100 ml. of acetone are added, while stirring at a temperature of from 0–5° C., 5 ml. of an 8 N solution of chromic acid. After five minutes, the mixture is diluted with water and extracted with ether. These extracts are washed with an aqueous sodium bicarbonate solution and water to neutrality, dried over sodium sulfate and evaporated to dryness to yield 5β,6β-methyleneestr-9-ene-3,17-dione, belting point 149–150° C.

In a similar fashion, 3β-acetoxy-5β,6β-methyleneestr-1(10)-en-17-one is converted to the corresponding 3β-hydroxy compound, which when oxidized as described above yields 5β,6β-methyleneester-1(10)-ene-3,17-dione.

Example 7

A solution of 5 g. of 3β-acetoxy-5β,6β-methyleneestr-9-en-17-one in 250 ml. of thiophene-free benzene is treated with 27.5 ml. of 4 N methylmagnesium bromide in anhydrous ether. The mixture is heated at reflux under anhydrous conditions for three hours, cooled, and cautiously treated with an excess aqueous ammonium chloride solution. This mixture is then extracted with ethyl acetate and these extracts are in turn washed with water, dried over sodium sulfate and evaporated to dryness to yield 5β,6β-methylene-17α-methylestr-9-ene-3β,17β-diol, which is recrystallized from methylene chloride:hexane. By subjecting this compound to the oxidation procedure described in Example 6, there is obtained 5β,6β-methylene-17α-methylestr-9-en-17β-ol-3-one.

In a similar fashion, by utilizing ethyl-, vinyl-, and prop-1-enylmagnesium bromide in the foregoing procedure there are respectively obtained: 5β,6β-methylene-17α-ethylestr-9-en-17β-ol-3-one; 5β,6β-methylene-17α-vinylestr-9-en-17β-ol-3-one; and 5β,6β-methylene-17α-prop-1-enyl)-estr-9-en-17β-ol-3-one.

By utilizing 3β-acetoxy-5β,6β-methylene-estr-1(10)-en-17-one as the starting material in the above procedure, there are respectively obtained: 5β,6β-methylene-17α-methylestr-1(10)-en-17β-ol-3-one; 5β,6β-methylene-17α-ethylestr-1(10)-en-17β-ol-3-one; 5β,6β-methylene-17α-vinylester-1(10)-en-17β-ol-3-one; and 5β,6β-methylene-17α-(prop-1-enyl)-estr-1(10)-en-17β-ol-3-one.

Example 8

A solution of 1 g. of 3β-acetoxy-5β,6β-methyleneestr-9-en-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 5β,6β-methylene-17α-ethynylestr-9-ene-3β,17β-diol, which is recrystallized from acetone:hexane. Upon subjecting this compound to the oxidation procedure of Example 6, there is obtained 5β,6β-methylene-17α-ethynylestr-9-en-17β-ol-3-one.

In a similar fashion there is obtained 5β,6β-methylene-17α-ethynylestr-1(10)-en-17β-ol-3-one from the corresponding estr-1(10)-ene.

Example 9

To a solution of 5 g. of 5β,6β-methylene-17α-ethynyl-estr-9-en-17β-ol-3-one in 100 ml. of anhydrous benzene are added 1 g. of p-toluenesulfonic acid and 10 ml. of acetic anhydride. The mixture is allowed to stand for 24 hours at room tempearture and is then poured with stirring into ice and water. The organic phase is separated, washed with 10% sodium carbonate solution and with water, dried and evaporated to yield 5β,6β-methylene-17α-ethynyl-17β-acetoxyestr-9-en-3-one, which is further purified through recrystallization from ether:hexane.

In a similar fashon there is obtained 5β,6β-methylene-17α-ethynyl-17β-acetoxyestr-1(10)-en-3-one from the corresponding 17β-hydroxy compound.

By substituting propionic, caproic, cyclopentylpropionic,, enanthic and the like anhydrides, in place of acetic anhydride, the corresponding 17β-acyloxy derivatives are obtained. Likewise, the other 17α-substituted estr-9-enes and estr-1(10)-enes of the present invention are similarly esterified via the foregoing procedure. Typical of such derivatives are the following: 5β,6β-methylene-17α-methyl-17β-acetoxyestr-9-en-3-one; 5β,6β-methylene-17α-methyl-17β-propionoyloxyestr-9-en-3-one; 5β,6β-methylene-17α-(prop-1-enyl)-17β-caproyloxyestr-9-en-3-one; 5β,6β-methylene-17α-vinyl-17β-acetoxyestr-9-en-3-one; 5β,6β-methylene-17α-methyl-17β-propionoyloxyestr-1(10)-en-3-one; 5β,6β-17α-ethynyl-17β-cyclopentylpropionoyloxyestr-1(10)-en-3-one; and 5β,6β-methylene-17α-vinyl-17β-enanthoyloxyestr-1(10)-en-3-one.

Example 10

Two milliliters of dihydropyran are added to a solution of 1 g. of 5β,6β-methylene-17α-methylestr-9-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with an aqueous sodium carbonate solution and water, dried and evaporated. This residue is chromatographed on neutral alumina, eluting with hexane, to yield 5β,6β-methylene-17α-methyl-17β-tetrahydropyranyloxyester-9-en-3-one, which is recrystallized from pentane.

In a similar fashion, the following compounds of the present invention are prepared: 5β,6β-methylene-17α-ethyl - 17β - tetrahydropyranyloxyestr - 9 - en - 3 -one; 5β,6β - methylene - 17α - vinyl - 17β - tetrahydropyranyloxyestr - 9 - en - 3 - one; 5β,6β - methylene - 17α - (prop-1 - enyl) - 17β - tetrahydropyranyloxyestr - 9 - en - 3 - one; 5β,6β - methylene - 17α - ethynyl - 17β - tetrahydropyranyloxyester - 9 - en - 3 - one; 5β,6β - methylene - 17α-methyl - 17β - tetrahydropyranyloxyestr - 1(10) - en - 3 - one; 5β,6β - methylene - 17α - ethyl - 17β - tetrahydropyranyloxyestr - 1(10) - en - 3 - one; 5β,6β - methylene - 17α - vinyl - 17β - tetrahydropyranyloxyestr - 1(10) - en - 3 - one; 5β,6β - methylene - 17α - (prop - 1 - enyl) - 17β - tetrahydropyranyloxyestr - 1(10) - en - 3 - one; and 5β,6β-methylene - 17α - ethynyl - 17β - tetrahydropyranyloxyestr - 1(10) - en - 3 - one.

What is claimed is:

1. A process for the preparation of a 3β - acyloxy - 5β,6β - methylene - 19 - nor steroid which comprises treating a 3β - acyloxy - 19 - hydroxy - Δ⁵ steroid with an α-fluorinated amine of the formula:

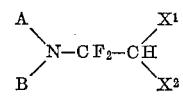

wherein,

X¹ is fluoro or chloro;

X² is fluoro, chloro or trifluoromethyl; and each of A and B is lower alkyl of one to six carbon atoms, or taken together, alkylene of five to seven carbon atoms, said treatment being conducted at elevated temperatures in an inert nonpolar solvent.

2. The process of claim 1 wherein the α-fluorinated amine is 1 - diethylamino - 1,1,2 - trifluoro - 1 - chloroethane, the inert nonpolar solvent is acetonitrile, and the treatment is conducted at reflux temperatures.

3. The process of claim 2 wherein the starting material is a 3β - acetoxy - 19 - hydroxypregn - 5 - en - 20 - one having either hydrogen or an acyloxy group in the 17α-position.

4. The process of claim 3 wherein the starting material is 3β,17α - diacetoxy - 19 - hydroxypregn - 5 - en - 20 - one.

5. The process of claim 2 wherein the starting material is 3β - acetoxy - 19 - hydroxyandrost - 5 - en - 17 - one.

6. A compound selected from those of the formula:

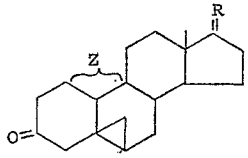

wherein,

R is an oxygen atom, the group

or the group

in which R¹ is hydrogen, hydroxy or a hydrocarbon acyloxy group of less than 12 carbon atoms;

R² is hydrogen, tetrahydropyranyl or a hydrocarbon acyl group of less than 12 carbon atoms;

R³ is hydrogen, lower alkyl, lower alkenyl or lower alkynyl; and

Z is a double bond between C-1 and C-10 or between C-9 and C-10.

7. A compound according to claim 6 wherein R is an oxygen atom.

8. A compound according to claim 6 wherein Z is a double bond between C-9 and C-10.

9. A compound according to claim 6 wherein R is the group

in which R¹ is as defined therein.

10. A compound according to claim 9 wherein R¹ is hydrogen.

11. A compound according to claim 9 wherein Z is a double bond between C-1 and C-10.

12. A compound according to claim 9 wherein R¹ is acyloxy and Z is a double bond between C-9 and C-10.

13. A compound according to claim 9 wherein R¹ is acetoxy.

14. Compounds according to claim 9 wherein R¹ is acyloxy and Z is a double bond between C-1 and C-10.

15. A compound according to claim 9 wherein R¹ is hydroxy.

16. A compound according to claim 6 wherein R is the group

in which R² and R³ are as defined therein.

17. A compound according to claim 16 wherein R² and R³ are hydrogen.

18. A compound according to claim 16 wherein Z is a double bond between C-9 and C-10.

19. A compound according to claim 16 wherein R² is hydrogen, or acetyl, R³ is methyl and Z is a double bond between C-1 and C-10.

20. A compound according to claim 16 wherein R² is hydrogen or acetyl, R³ is methyl and Z is a double bond between C-9 and C-10.

21. A compound according to claim 16 wherein R² is hydrogen or acetyl, R³ is ethyl and Z is a double bond between C-1 and C-10.

22. A compound according to claim 16 wherein R² is hydrogen or acetyl, R³ is ethyl and Z is a double bond between C-9 and C-10.

23. A compound according to claim 16 wherein R² is hydrogen or acetyl, R³ is vinyl and Z is a double bond between C-1 and C-10.

24. A compound according to claim 16 wherein R² is hydrogen or acetyl, R³ is vinyl and Z is a double bond between C-9 and C-10.

25. A compound according to claim 16 wherein R² is hydrogen or acetyl, R³ is ethynyl and Z is a double bond between C-1 and C-10.

26. A compound according to claim 16 wherein R² is hydrogen or acetyl, R³ is ethynyl and Z is a double bond between C-9 and C-10.

References Cited

UNITED STATES PATENTS 3,277,125  10/1966  Tadanier.

HENRY A. FRENCH, Primary Examiner

U.S. Cl. X.R.

260—239.55, 397.4, 397.5, 999